2,746,904
Patented May 22, 1956

2,746,904

17-HYDROXYCORTICOSTERONE, 21-BETA-CYCLOPENTYL PROPIONATE AND COMPOSITIONS THEREOF

Arnold C. Ott, Kalamazoo, Mich., assignor to The Upjohn Company

No Drawing. Application September 1, 1951, Serial No. 244,860

7 Claims. (Cl. 167—77)

The present invention relates to therapeutically useful compositions having an exceptional physiological effect. More particularly, the invention relates to 17-hydroxycorticosterone, 21-beta-cyclopentylpropionate and to physiologically active compositions containing the said ester.

It is an object of the present invention to provide the novel and useful organic compound, 17-hydroxycorticosterone, 21-beta-cyclopentylpropionate which is very valuable due to its adrenal cortical hormone-like activity of a prolonged nature. A further object of the invention is the provision of novel therapeutic compositions containing the said compound. Other objects of the invention will be apparent to one skilled in the art to which this invention pertains.

It has now been found that the novel compound, 17-hydroxycorticosterone, 21-beta-cyclopentylpropionate in the form of its solutions in a fluid vehicle, such as vegetable oils, glycols, thixotropic gels, or in the form of its microcrystalline suspensions in aqueous media, possesses a marked intrinsic as well as prolonged adrenal cortical hormone-like activity, which characteristic renders the said compound and compositions containing the same extremely useful in the treatment of certain physiological abnormalities, such as those due to an adrenal cortical hormone insufficiency. While it is well recognized in the art that certain esters of the same general class as 17-hydroxycorticosterone, 21-beta-cyclopentylpropionate are possessive of the same general type of activity, none of the prior art compounds, so far as is known, exhibit the high order of activity, both of an intrinsic nature and prolonged effect.

The compound of the present invention can be prepared by reacting 17-hydroxycorticosterone with beta-cyclopentylpropionyl chloride or bromide in the presence of a tertiary amine, such as pyridine or dimethylaniline, and thereafter recovering the desired ester from the mixture of reaction products. Beta-cyclopentylpropionyl chloride is obtained by reacting beta-cyclopentylpropionic acid with thionyl chloride, while the beta-cyclopentylbromide is obtained by reacting beta-cyclopentylpropionic acid with thionyl bromide.

The following examples are given to illustrate the preparation of the compound and compositions of the present invention, but are not to be construed as limiting.

*Example 1.—17-hydroxycorticosterone, 21-beta-cyclopentylpropionate (4-pregnene-3,20-dione-11β,17α,21-triol,21-beta-cyclopentylpropionate)*

To one part of 17-hydroxycorticosterone, M. P. 209–212° C., was added 4.5 parts of freshly-distilled pyridine. After complete solution was effected by stirring, there was added one and one-half parts of beta-cyclopentylpropionyl chloride with cooling. This mixture was allowed to stand for five hours and then taken up with diethyl ether. Free acid was removed by shaking with a cold ten percent solution of sodium carbonate, cold one normal sulfuric acid solution, and water. After drying, the ether was removed by distillation and the residue taken up in absolute methanol. The crystalline cyclopentylpropionic acid ester of 17-hydroxycorticosterone was obtained by filtration, M. P. 166–169° C.

This compound has the structural formula:

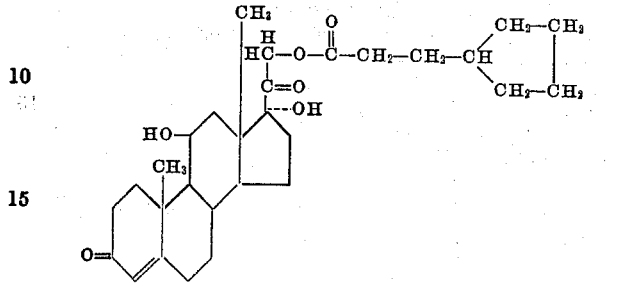

17-hydroxycorticosterone, 21-beta-cyclopentylpropionate

*Example 2*

A solution of three parts of dry, crystalline 17-hydroxycorticosterone, 21-beta-cyclopentylpropionate in twenty parts of diethyl ether was added with stirring to 100 parts of U. S. P. XII cottonseed oil contained in a 300-milliliter balloon flask. The flask was fitted with a capillary ebulliator attached to a stream of nitrogen, evacuated, and warmed on a steam bath. After about one hour, all of the ether had been removed and a clear oil solution remained. This solution contained three parts per thousand of 17-hydroxycorticosterone, 21-beta-cyclopentylpropionate.

For preservation purposes, five parts of chlorobutanol per thousand of solution may be added either to the hot oil or to the ether solution of the ester.

In a similar manner, solutions of 17-hydroxycorticosterone, 21-beta-cyclopentylpropionate are prepared using sesame, peanut, or corn oil.

*Example 3*

To a vigorously-stirred solution of three parts of 17-hydroxycorticosterone, 21-beta-cyclopentylpropionate in 95 parts of peanut oil at 24 degrees centigrade, 1.9 parts of dry aluminum monostearate was added at a substantially uniform rate over a period of five minutes. The temperature of the mixture was then raised at the rate of ten degrees centigrade per minute until a temperature of 120 degrees centigrade was obtained, which temperature was maintained for ten minutes. Stirring was then discontinued and the clear syrupy product was allowed to cool at room temperature. There was thus produced 100 parts of a thixotropic gel containing thirty parts of 17-hydroxycorticosterone, 21-beta-cyclopentylpropionate per thousand parts. Upon agitation, a free-flowing liquid suitable for injection after sterilization was obtained.

*Example 4*

One part of microcrystalline 17-hydroxycorticosterone, 21-beta-cyclopentylpropionate was carefully added to a stirred solution of twenty parts of physiological saline containing five parts of a suspending agent consisting of a water-soluble polyalkylene oxide derivative of a partial long chain fatty acid ester of a polyhydric alcohol and stirring continued at room temperature for thirty minutes. The product was a suspension of microcrystals of 17-hydroxycorticosterone, 21-beta-cyclopentylpropionate suitable after sterilization for parenteral administration.

Various modifications may be made in the present invention without departing from the spirit and scope thereof and it is therefore to be understood that I limit myself only as defined by the appended claims.

I claim:

1. A therapeutic composition having prolonged adrenal cortical hormone-like activity comprising a sterile solution of 17-hydroxycorticosterone, 21-beta-cyclopentylpropionate in a non-toxic fluid vehicle.

2. A therapeutic composition having prolonged adrenal cortical hormone-like activity comprising a sterile solution of 17-hydroxycorticosterone, 21-beta-cyclopentylpropionate in a non-toxic vegetable oil.

3. A therapeutic composition having prolonged adrenal cortical hormone-like activity comprising a sterile solution of 17-hydroxycorticosterone, 21-beta-cyclopentylnate and aluminum monostearate in a nontoxic vegetable oil.

4. A therapeutic composition having prolonged adrenal cortical hormone-like activity comprising an aqueous suspension of microcrystalline 17-hydroxycorticosterone, 21-beta-cyclopentylpropionate.

5. A composition of claim 2, wherein the vegetable oil is cottonseed oil.

6. A composition of claim 2, wherein the vegetable oil is peanut oil.

7. 17-hydroxycorticosterone, 21-beta-cyclopentylpropionate.

References Cited in the file of this patent

UNITED STATES PATENTS

| 2,265,183 | Miescher | Dec. 9, 1941 |
| 2,493,202 | Macek | Jan. 3, 1950 |
| 2,507,193 | Buckwalter | May 9, 1950 |

OTHER REFERENCES

Howard: Modern Drug Encyclopedia and Therapeutic Index, 4th edition, 1949.

Science News Letter, Apr. 24, 1948, pg. 261.

Endocrinology, Mar. 1946 (vol. 38), pgs. 214 and 215.